June 8, 1954 F. A. MORRIS 2,680,782

POWER SUPPLY CIRCUIT FOR ELECTRONIC TELEPHONE SYSTEMS

Filed April 26, 1950 2 Sheets-Sheet 1

INVENTOR.

Frank A. Morris

BY T. L. Bowes

Att'y

INVENTOR.
Frank A. Morris
BY J. L. Bowes
Atty

Patented June 8, 1954

2,680,782

UNITED STATES PATENT OFFICE 2,680,782

POWER SUPPLY CIRCUIT FOR ELECTRONIC TELEPHONE SYSTEMS

Frank A. Morris, Rochester, N. Y., assignor to Stromberg-Carlson Company, a corporation of New York Application April 26, 1950, Serial No. 158,132

32 Claims. (Cl. 179—18)

The present invention relates to automatic telephone systems and more particularly to power conservation circuits suitable for use in a fully automatic electronic telephone system.

Although not specifically limited thereto, apparatus embodying the present invention is particularly designed for use with and will hereinafter be illustrated and described in connection with the fully automatic electronic telephone system described and claimed in an application Serial No. 134,974, filed December 24, 1949, to Robert B. Trousdale and Frank A. Morris. Such an electronic telephone system, which is preferably designed to provide selective two-way communication between any two lines of a one hundred line group, is provided with a plurality of identical line selecting links both of the non-numerical type, such as line finders, and of the numerical type, such as selectors and connectors, which are common to the lines of the system and are controllable over calling lines to establish the desired talking circuits. Thus, in the system disclosed in the above-identified application, a plurality of identical finder-connector links are provided, the number of links employed in the system being chosen as required to handle the busy hour traffic requirements of the particular exchange. Each of the finder-connector links is comprised of a plurality of electronic circuits, described in detail in the above-mentioned application, which employ a large number of vacuum tubes having filaments which must be brought to the correct thermal emission temperature before proper operation of the circuits associated therewith is obtained. While it is possible to utilize vacuum tubes of the cold cathode type, which do not require a separate source of filament power, such tubes have objectionable characteristics which make them unsuitable for use in many of the circuits of the electronic telephone system. Additionally, many tube types are not available with cold cathodes so that it is not commercially feasible to provide the system with a complete complement of cold cathode tubes.

In many periods during each twenty-four-hour day, the traffic handled by the system is substantially reduced from its maximum, or busy hour value. Thus, for example, in a system employing ten percent trunking, three finder-connector links may be sufficient to handle average traffic, this number being capable of reduction during certain periods of the twenty-four-hour schedule; namely, during the late evening and early morning periods. However, several additional finder-connector links must be conditioned to anticipate traffic increase during the busy periods or peaks which usually occur during the hours of 11:00 a. m. and 5:00 p. m. In this connection, reference may be had to the volume "Automatic Telephony" by Smith and Campbell, published by McGraw-Hill Book Company in 1921 wherein there appears at page 382 a typical load curve of a central office for a twenty-four-hour period.

In the fully automatic electronic telephone system disclosed in the application referred to above, it is desirable to conserve the power consumed by the filaments of the vacuum tubes employed in the system. However, it is necessary to anticipate the use of additional finder-connector links and to condition such additional links for operation by heating the filaments of the vacuum tubes thereof so that there will be no time delay in obtaining dial tone when the additional links are seized. In this connection it will be understood that the life of a vacuum tube is a function of the length of time the filament is heated so that the tube complement of the finder-connector links and other associated switching equipment deteriorates whether the link is carrying calls or not so long as the filaments remain heated. On the other hand, it is not reasonable to expect to heat the filaments only when the finder-connector link is in demand since the preheating time is excessive and the constant heating and cooling of the filament shortens the life of the filament by a substantial amount due to the mechanical expansion and contraction thereof.

Accordingly, it is an important object of the invention to provide a fully automatic electronic telephone system embodying new and improved power conservation facilities.

It is a further object of the invention to provide a power conservation circuit for the line connecting links of an electronic telephone system in which heating of the filaments of additional links is progressively increased in proportion to the number of links then in use.

It is another object of the present invention to provide a power conservation circuit for the line selecting links of an electronic telephone system in which the preheating time for additional links is reduced in proportion to the number of links in use at a given time.

It is still another object of the present invention to provide a new and improved power conservation circuit for the line selecting links of an electronic telephone system wherein the heating and cooling of the filaments of the vacuum tubes of additional links is made to occur at a gradual rate so as to increase the life thereof.

It is a further object of the present invention to provide a new and improved power conservation circuit for the line selecting links of an electronic telephone system in which there is provided locking means for holding in an auxiliary link when it is in use.

The invention, both as to its organization and method of operation, together with further objects and advantages thereof, will best be understood by reference to the following specification taken in connection with the accompanying drawings, in which.

Figure 1:
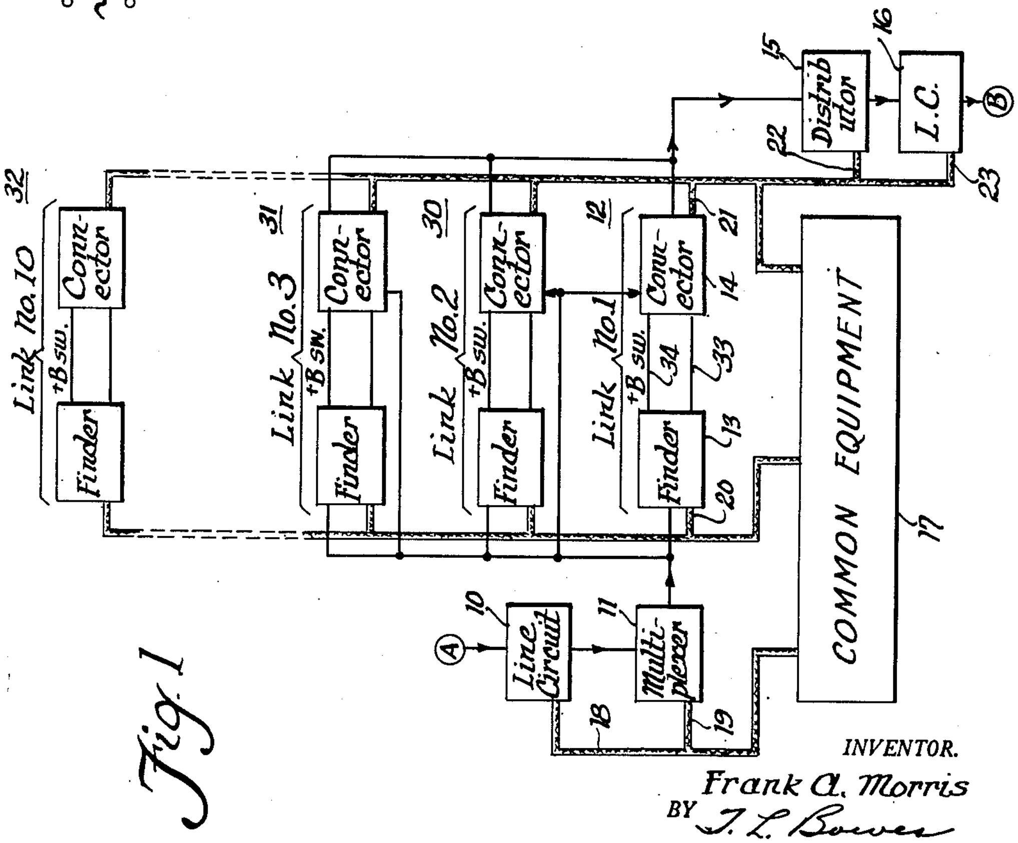
Fig. 1 is a block diagram of an electronic telephone system embodying the present invention.

Referring now more particularly to the drawings, there is illustrated in Fig. 1, in block diagram form, a fully automatic electronic telephone system of the improved form described in detail in the above-identified application. In the system shown, a subscriber substation A is connected to a line circuit 10, the output of which is connected to a multiplexer 11. The multiplexer 11 feeds a plurality of finder-connector links 12, 30, 31, 32, etc., each of which comprises a line finder circuit 13 and a connector circuit 14. Each finder-connector link may be directively controlled to establish a two-way talking circuit between any calling substation of the system, such as the substation A, and any called substation of the system, such as the substation B. To accomplish this, the output sides of the link circuits are commonly connected to the input terminals of a distributor 15, the output terminals of which are individually connected to the different line circuits serving the different lines, including the line circuit 16 at which is terminated the line serving the substation B.

In order to perform the necessary functions to provide a two-way communication system, common equipment, indicated generally at 17, is provided to supply the requisite gating pulses, dial tones, busy signals, etc., through interconnecting cables to the units referred to above. Thus, the line circuit 10 is connected to the common equipment 17 through a cable 18, the multiplexer 11 through a cable 19, the finder 13 through a cable 20, the connector 14 through a cable 21, the distributor 15 through a cable 22 and the line circuit 16 through a cable 23. It will be understood that the cables 18—23 may be separately connected to the common equipment 17, these cables being grouped together merely for convenience in illustrating the connections between the common equipment 17 and the other components of the system.

The illustrated system is capable of serving 100 lines or substations and the number of finder-connector links necessary to give adequate service for the 100 lines of the system is determined by the peak, or busy hour traffic of the system. If the system utilizes ten per cent trunking to connect the 100-line multiplexer 11 with the corresponding 100-line distributor 15 ten finder-connector links must be provided. Thus, there is provided in the system of Fig. 1 a second finder-connector link indicated generally at 30, a third finder-connector link indicated generally at 31, the tenth link being indicated generally at 32.

While the units 10 through 17 are illustrated in detail in the application referred to heretofore, and reference may be had to that application for a detailed description thereof, for the purposes of the present invention it may be stated that the system of Fig. 1 utilizes a system of multiplexing, namely, pulsed sampling effectively at an ultrasonic rate of the control and intelligence signals produced at each substation of the system, to provide signal channel separation. Specifically, each line or substation A of the system is assigned a particular pulse time position in each of repetitive pulse frames each comprising one hundred time positions. Intelligence and control signals developed at any one substation of the system are sampled only in the particular pulse time position assigned to the particular substation and the samples are carried through the signal transmitting components of the system as far as the connector stage 14 on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different time position of successive pulse frames for redistribution to the particular called line and substation assigned the new time position. The same process is employed in transmitting intelligence from the called substation back to the calling substation.

The finder circuit 13 of the particular finder-connector link 12 which is connected to the corresponding connector 14 by means of conductors 33 and 34 functions strictly as a control unit. Thus, the finder 13 is provided to perform the functions of determining when the link 12 shall be taken into use, determining the calling line with which the link is to be associated in handling a call and determining the particular time position of successive pulse frames which is assigned to the calling line and during which signal bearing pulses derived from the multiplexer 11 shall be effective to produce a response in the finder and in the associated connector 14.

Included in the functions of the finder 13 is that of conditioning the associated connector 14 for operation when the link 12 is definitely associated with a calling line to handle the call initiated on the line. This is accomplished through operation of the finder 13 to impress operating anode potential upon a plurality of the tubes in the connector 14 over the +B switch conductor 34. The finder 13 is also connected to the connector 14 on an individual link basis by the conductor 33 which supplies finder gate pulses from the finder 13 to the connector 14. From the foregoing, it is evident that the +B switch conductors of the individual links are energized in accordance with seizure of the particular link or links which are necessary at a particular instant to handle the traffic of the system.

In order successively to assign particular ones of the finder-connector links 12 to the use of calling lines, the system disclosed by the application referred to above utilizes an allotter circuit to produce allotter pulses which are supplied to the finder circuit 13 of each link. The allotter pulses function to allot the finders 13 for use in a given sequence. Thus, for example, the allotter assigns the first link to the first calling line, the second link to the second calling line, the third link to the third calling line, etc.

In the system described above, there are many periods during each twenty-four hour day in which a minimum number of finder-connector links is required. Thus, during the early morning and late evening hours, one or two finder-connector links may be sufficient to handle any traffic condition which may occur. However, during peak traffic conditions it is necessary to use the maximum number of links provided, the system illustrated being predicated on a basis of ten per cent trunking or a maximum of ten finder-connector links. Inasmuch as the finders and connectors of individual links employ a large number of vacuum tubes, it is desirable to provide means for supplying filament power to certain of the links only when the links are needed to meet traffic demands. In this connection, it will be appreciated that the ten links illustrated in Fig. 1 are necessary only to meet peak busy hour traffic and hence only a small number of these links need be energized continuously.

Figure 2:
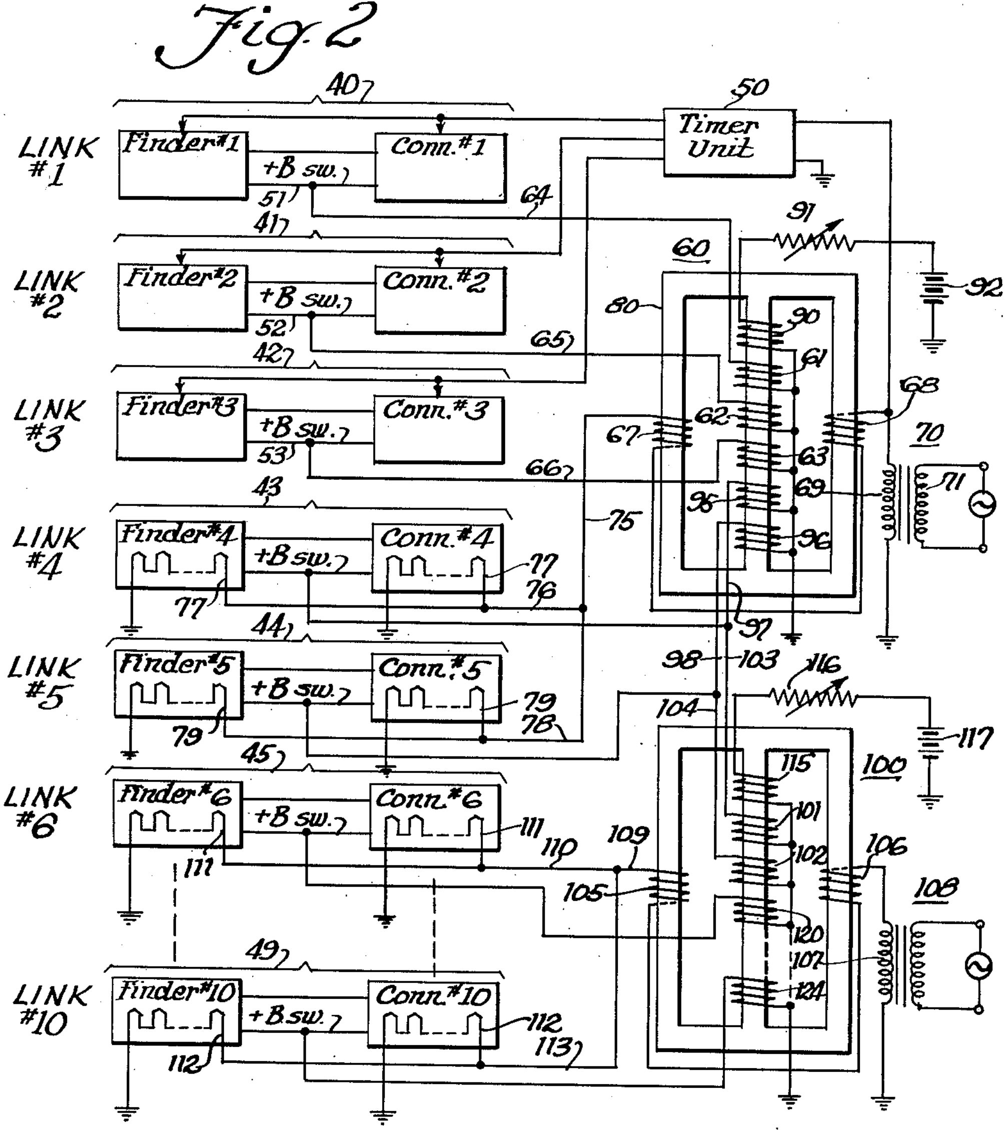
Fig. 2 is a schematic diagram partly in block diagram form of the power conservation circuit embodied in the electronic telephone system of Fig. 1.

To conserve the filament power consumed by the finder-connector links of the system of Fig. 1 and to anticipate seizure of and prepare for use additional links as they may be needed, there is provided as shown in Fig. 2 a power conservation circuit constructed in accordance with the principles of the present invention. Thus, referring to Fig. 2, there is illustrated a group of ten finder-connector links which have been indicated generally by the numerals 40–49. The finder-connector links 40–49 are preferably of the type illustrated in the above-identified application, and each of the finder-connector links is interconnected by means of a +B switching conductor which supplies anode potential to particular circuits of the connectors when the calling line is definitely associated with a particular called line.

In the system illustrated in Fig. 2, the first three links 40–42 are supplied continuously with filament power so that the vacuum tubes employed in the finders and connectors of these links are continuously heated. The three links 40–42 normally handle average non-busy hour traffic and inasmuch as these links are continuously supplied with filament power, there is no delay due to filament heating and hence no delay in obtaining dial tone when only these links are required to handle traffic.

In the event that all three links 40–42 are not needed to handle the traffic of the system during a given period, means may be provided for timing the application of filament power to the links 40–42. Specifically, a timer unit 50 may be provided, which is connected to a suitable source of filament power and which controls the application of filament power to the links 40–42. For example, during the early morning and late evening periods, the traffic may require only two active links.

During peak traffic conditions, the number of calls handled may vary within wide limits and it then becomes necessary to energize additional ones of the finder-connector links 43–49. To accomplish this end, control circuits are provided which operate from the +B switch conductors 51, 52 and 53 respectively of the links 40–42 to supply filament power to the next succeeding finder-connector links 43 and 44. In this connection, it will be recalled that the +B switching circuit is energized only when a finder-connector link is operatively associated with a particular calling line. Energization of the +B switching circuit of a particular link is an indication that that link is in use and the switching circuit may thus be used as a control means for conditioning additional links to serve additional calling lines.

While any suitable means may be used to control the application of filament power to succeeding finder-connector links in accordance with simultaneous seizure of the continuously heated links, it is preferred to accomplish such control without the use of relays, stepping switches or equivalent mechanical devices having moving parts. Specifically, there is provided in accordance with the present invention saturable core reactor means having control windings energized by the +B switching circuits of the continuously heated links and having a saturation winding suitable for controlling the application of filament power to the next succeeding links. As shown, the control circuit of the present invention comprises a saturable core reactor indicated generally at 60. The saturable core reactor 60 is provided with control windings 61, 62 and 63 which are wound upon the central leg of the core of the reactor 60. One end of each of the control windings 61–63 is connected to ground and the other ends of these windings are connected through the conductors 64, 65 and 66, respectively, to the +B switching circuits of the finder-connector links 40, 41 and 42. The alternating current, or saturation winding of the reactor 60, comprises a pair of coils 67 and 68 which are wound on the outer legs of the reactor and are series connected to the secondary winding 69 of a filament power transformer 70. The primary winding 71 of the transformer 70 is connected to any suitable source of alternating current.

The saturable core reactor 60 is of the type having windings positioned on the central leg of the reactor which are supplied with unidirectional current so as to change the degree of saturation in the portion of the core on which the alternating current coils 67 and 68 are located. Thus, the direct magneto-motive force produced by the control windings 61–63 acts on the two outer legs of the core in parallel, whereas the alternating magneto-motive force acts on the path including only the outer legs of the core. By variation of the unidirectional current supplied to the control windings 61–63, the degree of saturation in the core is varied and hence the reactance of the alternating current windings 67 and 68 is altered.

The other end of the series connected windings 67 and 68 is connected to the filament circuits of the next succeeding finder-connector links 43 and 44. Thus, the coil 67 is connected through conductors 75 and 76 to the filament circuits 77 of the finder-connector link 43 and through conductors 75 and 78 to the filament circuits 79 of the finder-connector link 44. The filament circuits 77 and 79 are illustrated in Fig. 2 as comprising a series of filaments which are connected in series from the saturation winding 67 to ground. As the reactance of the windings 67 and 68 is decreased under the influence of the control windings 61–63, the secondary winding 69 of the filament transformer 70 operates to apply filament power to the filament circuits 77 and 79. In this connection it will be understood that the filaments of the finder circuits and connector circuits of the links 43 and 44 may be connected in any desired series or parallel combination, the filaments of the vacuum tubes of these circuits having been indicated as being connected in series merely for convenience of illustration. For example, the tubes of the connector circuit of the link 43 may all be connected in parallel from the conductor 76 to ground. It will be appreciated that many combinations of filament connections may be made; however, in all cases, the filament transformer 70 is arranged to provide the proper potential across the secondary winding 69 thereof for operation of the particular filament network used.

In considering the operation of the above-described reactor control circuit, it should first be mentioned that energization of the filament circuits of the succeeding links 43 and 44 should not be delayed until all three of the continuously heated links 40–42 are in use. This will be readily apparent when it is considered that two incoming calls may simultaneously require the use of additional finder-connector links so that if all of the links 40–42 are then in use a delay in obtaining dial tone will result due to the time required to bring the filaments of the succeeding links up to the proper operating temperature. Accordingly, it is preferable to provide the +B switching circuits of each of the continuously heated links 40–42 with the proper circuit constants to give the desired change in reactance of the windings 67 and 68 when any two of the links 40–42 are in use. Thus, considering the application of unidirectional potential to the control winding 61 in response to seizure of the finder-connector link 40, the impedance of the control winding 61 is so chosen that the value of unidirectional potential applied thereto from the +B switching circuit of the link 40 is sufficient to provide substantially one-half the necessary change in reactance of the windings 67 and 68.

To provide this type of operation, the core 80 of the reactor 60 is chosen with a saturation curve having a changing slope and a substantially flat portion wherein there is substantially no change in reactance. Each of the control windings 61, 62, and 63 is so designed that when energized it provides a direct magneto-motive force sufficient to shift the operating point of the reactor to a point substantially half way to the flat portion of the saturation curve, so that simultaneous seizure of any two of the links 40–42 produces sufficient direct magneto-motive force to shift the operating point of the reactor onto the flat portion of the saturation curve. With this arrangement simultaneous seizure of any two of the finder-connector links 40–42 produces a change in the reactance of the windings 67, 68 such that the correct operating potential is supplied to the filament circuits 77 and 79 from the filament transformer 70.

Figure 3:
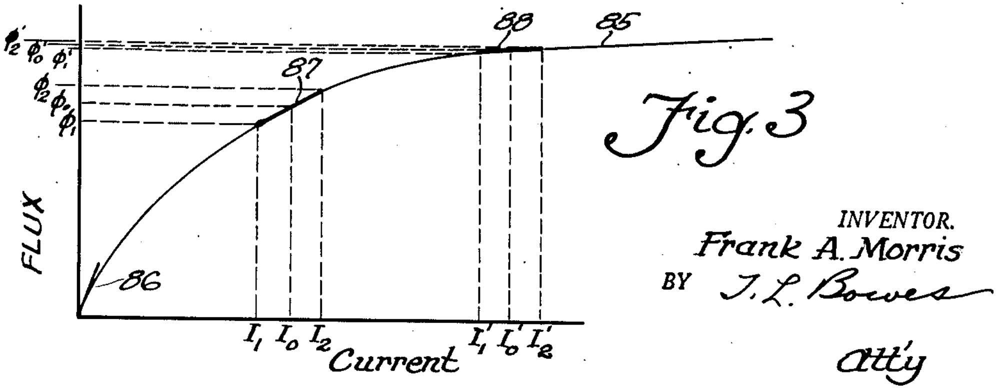
Fig. 3 is a graph showing an operating characteristic of a portion of the apparatus of Fig. 2.

In order more clearly to visualize the above-described operation of the saturable core reactor, reference may now be had to Fig. 3, wherein there is illustrated a suitable magnetization curve for the core 80 of the saturable core reactor. In Fig. 3, current values are plotted along the abscissa of the graph and flux values are plotted along the ordinate thereof. The saturation curve indicated generally at 85 is illustrated as having an initial portion of relatively steep slope 86, an intermediate portion 87 of substantially reduced slope, and a further portion 88 which is substantially flat. If it is assumed that a unidirectional current $I_0$ flows through any one of the control windings 61–63 in response to seizure of any one of the links 40–42, the superimposed alternating current excitation supplied by the transformer 70 may cause variation in current from $I_1$ to $I_2$ and a corresponding change in flux from $\phi_1$ to $\phi_2$. The apparent inductance to alternating current is proportional to the flux change from $\phi_1$ to $\phi_2$, and hence is proportional to the slope of the saturation curve at any given point. Thus, the reactance of the windings 67 and 68 is proportional to the slope of the intermediate portion 87 of the magnetization curve. It is evident from Fig. 3 that the slope of the magnetization curve at the intermediate point 87 is substantially reduced over its value at the initial portion 86 thereof. Consequently, the reactance of the windings 67 and 68 is substantially reduced from the no-current value so that a proportional amount of filament power is supplied to the filament circuits of the succeeding links 43 and 44. However, the reactance of the windings 67 and 68 is still sufficiently great with only one of the control windings 61–63 energized to prevent the application of full filament power to the succeeding links 43, 44.

When a second one of the links 40–42 is seized in response to an incoming call and seizure of one of the links 40, 41, and 42, the control current is increased by a proportional amount and is indicated as having the value $I_0'$ in Fig. 3. The A. C. excitation superimposed upon the unidirectional current $I_0'$ is illustrated as having the values $I_1'$ and $I_2'$ and causes a corresponding variation in flux from $\phi_1'$ to $\phi_2'$. It is evident from Fig. 3 that the slope of the curve at the point 88 thereof is substantially reduced over its value at the initial and intermediate portions of the curve and hence the inductance to alternating current of the windings 67 and 68 is reduced to substantially a minimum value.

With this arrangement, simultaneous seizure of any two of the links 40–42 produces sufficient change in reactance to supply rated filament power to the succeeding links 43 and 44. If the third one of the continuously heated links 40–42 is then seized, the unidirectional control current is increased by a proportional amount. However, the slope of the magnetization curve 85 remains substantially unchanged for further increases in the magnetizing current and hence the reactance of the windings 67 and 68 remains substantially unchanged and rated filament power is continuously supplied to the additional links 43, 44.

With a reactor core having a magnetization curve of substantially the configuration shown in Fig. 3 filament power supplied to the additional links 43 and 44 is proportionately increased as a greater number of the continuously heated links are placed in use. This is readily apparent from Fig. 3 when it is realized that the initial slope 86 of the magnetization curve is substantially greater than the slope of succeeding portions thereof so that seizure of any one of the links causes a proportional heating of the filament circuits of the succeeding links and a consequent reduction in the preheating time required by these circuits. By using a core with a magnetization curve of the above-described configuration, fewer additional links need be preheated inasmuch as the additional links are brought closer and closer to the proper operating temperature as the number of seized continuously heated links increases. The use of a core having a magnetization curve of the above-described type has the further advantage of heating and cooling the filaments of the additional links 43 and 44 at a more gradual rate, thereby prolonging the life of the vacuum tubes in these links.

In the event that a maximum amount of filament power is to be conserved, a saturable core reactor may be chosen with a core material having a relatively sharp inflection point or knee, above which the magnetization curve is substantially flat. For example, the core material may be of the type known as mixed crystal ferrites, or ferrite magnetic material having high permeability and resistivity, which material is commonly used in sweep transformers and other high efficiency circuits and has a magnetization curve of the above-described type. However, it will be appreciated that any suitable core material having initial and final portions of uniform slope connected by a sharp inflection point or knee may be utilized. With a magnetization curve of uniform slope up to the knee portion thereof it will be readily apparent that the reactance of the windings 67 and 68 will not change appreciably until the knee of the curve is passed. With such an arrangement, the filament power dissipated in the additional links 43 and 44 is held to a minimum, inasmuch as substantially no power is supplied to these additional links until simultaneous seizure of a sufficient number of the continuously heated links occurs to shift the operating point beyond the knee of the curve.

In order that the initial operating point of the saturable core reactor 60 may be varied so as to provide the correct value of reactance for simultaneous seizure of any two of the links 40–42, means may be provided for varying the operating point of the saturable core reactor. Specifically, an auxiliary control winding 90 may be provided which is positioned on the center leg of the reactor and is connected through a variable resistor 91 and a unidirectional source of potential 92 to ground. With this arrangement, the flow of current through the auxiliary winding 90 may be varied so as to obtain the correct operating point when the links 40–42 are in use.

When either of the additional links 43 or 44 are supplied with rated filament power and the link is seized on an incoming call, it is necessary to provide an interlock circuit to insure the application of filament power to the seized additional link for the duration of the call irrespective of the termination of the calls on one or more of the controlling links 40–42. To accomplish this end, locking windings 95 and 96 are provided which are positioned on the central core of the reactor and which are respectively arranged to be controlled by the +B switching circuits of the additional links 43 and 44. Thus, the locking winding 95 is connected through the conductor 97 to the +B switching conductor of the link 43 and the locking winding 96 is connected through the conductor 98 to the +B switching conductor of the link 44. In order to insure that the links 43 and 44 are supplied with rated filament power even though all of the continuously heated links 40–42 are idle, the locking windings 95 and 96 are so chosen that they cause a change in direct magneto-motive force equivalent to the change produced by any two of the continuously heated links 40–42. For example, when the link 43 is seized by an incoming call, the +B switching circuit thereof provides sufficient flow of current through the locking winding 95 to shift the operating point of the reactor to the substantially flat portion of the magnetization curve so that subsequent termination of calls on the continuously heated links 40–42 will cause substantially no change in the filament power supplied to the link 43. Likewise, the link 44, when placed in use, supplies the necessary current to locking winding 96 so as to insure the application of rated filament power to the link 44 during the period when the link is in use.

In the system described thus far, the circuits are arranged so that when any two of the three continuously heated links 40–42 are in use, the links 43 and 44 are prepared for use in anticipation of possible seizure of the third link 42. Under normal conditions this arrangement assures link availability without time delay as the traffic becomes slightly heavier during the busy hour periods. However, the peak demand during the busy hour periods may be more than the continuously heated links can handle and one of the next group of links; namely, link 43 or link 44, will be seized. Upon seizure of either the link 43 or 44, it is desirable to energize the remaining links in the system, namely, the links 45–49, it being preferred to energize the remainder of the links when either the fourth or the fifth link is seized so as to avoid rapid turning on and off of the remaining links with traffic fluctuations. With such a method of operation the remaining links 45–49 are heated when either the fourth or the fifth link is in use so that the remaining links 45–49 are not subjected to rapid heating and cooling cycles and the consequent shortening of tube life which results therefrom.

In order to apply rated filament power to the remaining links 45–49 in response to seizure of either of the links 43 or 44, there is provided a second saturable core reactor, indicated generally at 100. The reactor 100 is provided with a pair of control windings 101 and 102 which are connected respectively to the +B switching circuits of the links 43 and 44, one end of each of the control windings 101 and 102 being connected to ground. Thus, the control winding 101 is connected through the conductor 103 to the +B switching conductor of link 43 and the control winding 102 is connected through a conductor 104 to the +B switching conductor of link 44. The alternating current winding of the reactor 100 comprises a pair of coils 105 and 106 which are wound on the outer legs of the core of the reactor 100, the coils 105 and 106 being connected in series to the secondary 107 of a second filament transformer 108. The primary winding of the transformer 108 is connected to any suitable source of alternating current. The coil 105 is connected through the conductors 109 and 110 to the filament circuits 111 of the finder and connector units of the link 45. Likewise, filament power is supplied to the filament circuits of the remaining finder-connector links, conductor 113 being illustrated as applying power to the filament circuits 112 of the last link 49. To control the operating point of the saturable reactor, an auxiliary winding 115 is provided which is positioned on the central leg of the reactor and is connected through a variable resistor 116 to a unidirectional source of potential illustrated as the battery 117.

In considering the operation of the second reactor control circuit, it is evident that the control windings 101 and 102 are again supplied from the +B switching circuits of their respective finder-connector links. However, the impedance of the windings 101 and 102 is so chosen that the current flowing therethrough in response to energization of the +B switching circuit of the particular link produces a sufficient magnetomotive force to shift the operating point of the reactor to the substantially flat portion of the magnetization curve. Thus, seizure of either the link 43 or the link 44 causes sufficient current to flow through the associated control winding 101 or 102 to change the reactance of windings 105, 106 so as to supply rated filament power from the transformer 108 to the remaining links 45–49. In this connection it will be understood that the correct value of magnetizing current may be provided either by proper adjustment of the potential supplied from the +B switching circuit, or in the alternative, by means of a voltage dropping resistor (not shown) which may be connected in series with the control winding so as to control the current flowing through the winding.

In order to insure that the remaining links 45–49 are supplied with rated filament power for the period when the links may be in use, there are provided locking windings associated with each one of the links 45–49 so as to insure continuous use of the link even though the links 40–44 are idle. Thus, there is provided a locking winding 120 which is positioned on the central leg of the reactor 100 and is connected from the +B switching circuit of link 45 to ground. Likewise, the remaining links are provided with locking windings, the link 49 being illustrated as provided with a locking winding 124. With this arrangement seizure of any of the links 45–49 causes energization of the +B switching circuit incorporated therein and a consequent flow of current through the locking winding associated therewith. The value of current flowing through the locking windings 120–124 is so chosen that the operating point of the reactor is shifted to the flat portion of the magnetization curve whereby rated filament power is supplied to the particular seized link for the duration of the call.

The power conservation circuit discussed above has been illustrated in connection with a telephone system employing a 10 per cent trunking arrangement between the lines of the system, that is, a group of ten finder-connector links is considered sufficient to handle the maximum traffic between the one hundred lines of the system. In the event that higher percentage trunking is needed, as, for example, in commercial exchanges where the busy hour traffic is substantially greater, the number of continuously heated links may be increased so as to provide for heavier average traffic. It will therefore be appreciated that the illustration of the use of a group of three continuously heated links, a group of two subsequently energized links and a group of five finally energized links, is made only by way of illustration and that the present invention is not specifically limited to the arrangement shown. More generally considered, the finder-connector links may be grouped into a first group of continuously heated links, a second group of links adapted to handle busy hour periods, and a third group of links adapted to handle fluctuations in the busy hour periods. Thus, in the illustrated system, the links 40–42 are continuously heated, the links 43 and 44 are conditioned for use upon simultaneous seizure of any two of the links 40–42, and the remaining links 45–49 are conditioned for use upon seizure of either of the links 43 or 44.

Figure 4:
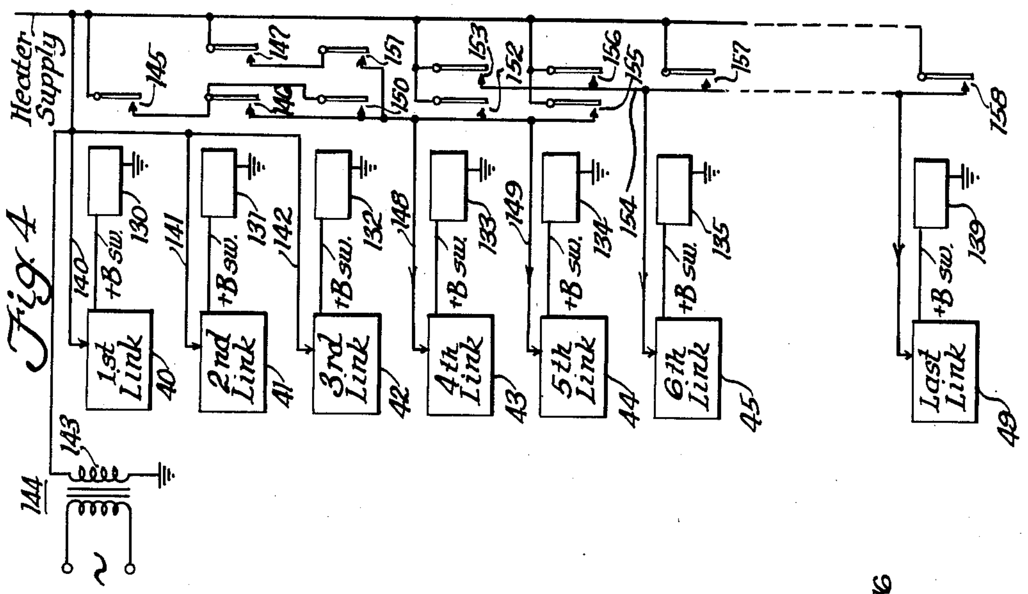
Fig. 4 is an alternative embodiment of the present improved power conservation circuit which may be embodied in the electronic telephone system of Fig. 1.

The conservation of filament power may also be achieved by the alternative embodiment of the invention illustrated in Fig. 4, wherein there is shown a control circuit employing relays which are controlled by individual links of the system. Thus, referring to Fig. 4, the system is again illustrated as employed 10 per cent trunking, there being ten finder-connector links illustrated in block diagram form by the numerals 40–49. The +B switch conductors of individual links are connected to a series of relays 130–139. Seizure of any one of the links causes energization of the +B switch conductor associated therewith and hence energization of the relay circuit connected to the +B switching circuit, so that the contacts of the relay are closed upon seizure of the link associated therewith. In the system illustrated in Fig. 4, the first three links 40–42 are again illustrated as being continuously heated. Thus, the link 40 is supplied with filament power through the conductor 140, the link 41 is supplied with filament power through the conductor 141 and the link 42 is supplied with filament power through the conductor 142. Filament power is illustrated as being supplied from the secondary winding 143 of a filament transformer 144, the primary winding of which is connected to a suitable source of alternating current.

In order to apply filament power to the links 43 and 44 in response to simultaneous seizure of any two of the first three links, the contacts of the relays 130–132 are interconnected in the manner shown in Fig. 4. Thus, considering the case when the links 40 and 41 are simultaneously in use, the contacts 145 associated with relay 130 and the contacts 146 and 147 associated with relay 131 are all closed. Filament power is thus supplied to the links 43 and 44 through the contacts 145 and 146 and the conductors 148 and 149. If links 41 and 42 are simultaneously in use, the contacts 146 and 147 associated with the relay 131 and the contacts 150 and 151 associated with the relay 132 are all closed. Filament power is then supplied to the links 43 and 44 through the contacts 147 and 151 and the conductors 148 and 149. In the event that links 40 and 42 are simultaneously in use the contacts 145, and the contacts 150 and 151 are all closed so that filament power is supplied to links 43 and 44 through the contacts 145 and 150 and the conductors 148 and 149.

In the event that either one of the links 43 or 44 is seized, the remaining links 45–49 are then supplied wtih rated filament power so as to avoid rapid turning on and off of the remaining links due to traffic fluctuations as has been discussed in connection with the circuit of Fig. 2. In the embodiment of Fig. 4, such operation is obtained by interconnecting the relay contacts associated with relays 133 and 134 in the manner shown in Fig. 4. Thus, when the link 43 is seized on an incoming call, the contacts 152 and 153 associated with the relay 133 are closed and filament power is supplied through the contacts 153 and the conductors 154, 155 to the remaining links 45–49. If the link 44 is seized on an incoming call, the contacts 155 and 156 associated with relay 134 are closed and filament power is supplied through the closed contacts 156 and the conductor 154 to the remaining links 45–49.

If the controlling links 40–42 are released while links 43 or 44 are being used, it is necessary to provide auxiliary means for supplying filament power to the links 43 and 44 while they are in use. In the illustrated embodiment such a lock-in arrangement is provided by the contacts associated with the individual relays of the links 43 and 44. Thus, when the link 43 is in use, the contacts 152 are closed so as to insure the application of filament power to the link 43, although all of the contacts associated with relays 130–132 are open. Likewise, when the link 44 is in use, the contacts 155 are closed so as to insure the application of filament power to the link 44. In the event that the contacts 153 and 156, which supply filament power to the remaining links 45–49 in response to seizure of either of the links 43 or 44, are opened while one of the remaining links 45–49 is in use, the remaining links are provided with relay contacts which insure the application of filament power thereto during the period of the call. Thus, when the link 45 is seized on an incoming call, the contacts 157 associated with relay 135 are closed so as to insure the application of filament power to the link 45 although the relay contacts associated with relays 130–134 may be open. Likewise, each of the remaining links 46–49 is provided with locking contacts, the contacts 158 being illustrated as controlling the last link 49.

While the system has been described in connection with an electronic telephone system employing an allotter circuit, wherein the links are assigned for use in predetermined order, it will be understood that the power conservation circuit of the present invention may equally well be employed in a self-allotting system. Thus, if no allotter pulses are supplied to particular ones of the individual finder-connector links, the three links which are energized continuously become first choice links by virtue of their being the only ones able to associate themselves with particular calling lines, the other links being unheated and hence unable to establish the requisite circuits between the calling and called lines of the system.

While there have been described what are at present considered to be the preferred embodiments of the invention, it will be understood that various modifications may be made therein which are within the true spirit and scope of the invention as defined in the appended claims.

What is claimed as new and is desired to be secured by Letter Patent of the United States is:

1. In an automatic telephone system, a plurality of lines, first and second groups of line selecting links, means including said links for setting up connections between said lines, means for supplying rated power to the links of said first group to render the same normally operative to set up connections between said lines, means for supplying less than rated power to the links of said second group to prevent the same from setting up said connections, and means responsive to seizure of a predetermined number of the links of said first group by calling ones of said lines for supplying rated power to at least a portion of the links of said second group to condition the same for operation in setting up said connections.

2. In an automatic telephone system, a plurality of lines, first and second groups of line selecting links, means including said links for setting up connections between said lines, means in each of said links for developing a control potential in response to operative association of the link with a calling one of said lines, means for supplying rated power to the links of said first group to render the same normally operative to set up connections between said lines, means for supplying less than rated power to the links of said second group to prevent the same from setting up said connections, and means jointly responsive to the control potentials developed by a predetermined number of the links in said first group for supplying rated power to at least a portion of the links of said second group to condition the same for operation in setting up said connections.

3. In an electronic telephone system of the common equipment type having a series of electronic circuits individual ones of which are arranged to be seized in accordance with the traffic requirements of the system, means for conserving the filament power supplied to said series of electronic circuits comprising, means for continuously supplying filament power to a first group in said series of electronic circuits, and means responsive to simultaneous seizure of a predetermined number of said first group of circuits for supplying filament power to the remaining ones of said series of electronic circuits thereby to condition the same for subsequent seizure in the event that all of said first group of circuits are busy.

4. In an electronic telephone system of the common equipment type and having a series of electronic circuits individual ones of which are arranged to be seized in accordance with the traffic requirements of the system, means for conserving the filament power supplied to said series of electronic circuits comprising, means for continuously supplying filament power to a first group of said series of electronic circuits, means responsive to simultaneous seizure of a predetermined number of said first group of circuits for supplying filament power to a second group of electronic circuits within said series, and means responsive to seizure of any one of said second group of circuits for supplying filament power to the remaining ones of said series of circuits.

5. In an electronic telephone system of the common equipment type and having a series of electronic circuits individual ones of which are arranged to be seized in accordance with the traffic requirements of the system, means for conserving the filament power supplied to said series of electronic circuits comprising, means for continuously supplying filament power to a first group of said series of electronic circuits, means responsive to simultaneous seizure of a predetermined number of said first group of circuits for supplying filament power to a second group of electronic circuits within said series, and means responsive to seizure of any one of said second group of circuits for supplying filament power to the remaining ones of said series of circuits and for maintaining filament power supplied to the seized circuit in said second group.

6. In an electronic telephone system of the common equipment type and having a series of electronic circuits individual ones of which are arranged to be seized in accordance with the traffic requirements of the system, means for conserving the filament power supplied to said series of electronic circuits comprising, means for continuously supplying filament power to a first group of said series of electronic circuits, and means responsive to simultaneous seizure of a predetermined number of said first group of circuits for supplying filament power to the remaining ones of said series of electronic circuits thereby to condition the same for subsequent seizure in the event that all of said first group of circuits are occupied, and means responsive to seizure of any one of said remaining circuits for maintaining filament power supplied to said seized remaining link.

7. In an electronic telephone system of the common equipment type and having a first group of continuously heated electronic circuits individual ones of which are adapted to be seized in accordance with the average traffic requirements of the system, a second group of electronic circuits adapted to be seized in accordance with the busy hour traffic of the system and a third group of electronic circuits adapted to be seized in accordance with fluctuations in the busy hour traffic of the system, means for conserving the filament power requirements of said groups of electronic circuits comprising, means responsive to simultaneous seizure of a predetermined number of said first group of circuits for supplying filament power to said second group of circuits, and means responsive to seizure of any one of said second group of circuits for supplying filament power to said third group of circuits.

8. In an electronic telephone system of the common equipment type and having a first group of electronic circuits individual ones of which are adapted to be seized in accordance with the average traffic requirements of the system, a second group of electronic circuits adapted to be seized in accordance with the busy hour traffic of the system and a third group of electronic circuits adapted to be seized in accordance with fluctuations in the busy hour traffic of the system, means for conserving the filament power requirements of said system comprising, timing means for controlling the application of filament power to said first group of electronic circuits in accordance with the average traffic requirements of the system, means responsive to simultaneous seizure of a predetermined number of said first group of circuits for supplying filament power to said second group of circuits, and means responsive to seizure of any one of said second group of circuits for supplying filament power to said third group of circuits.

9. In an electronic telephone system, means for conserving the filament power required by a series of finder-connector links of said system comprising, means for continuously supplying filament power to a first group of said finder-connector links, means responsive to simultaneous seizure of a predetermined number of said first group of links for supplying filament power to a second group of links in said series of links, and means responsive to seizure of any one of said second group of links for supplying filament power to the remaining links in said series.

10. In an electronic telephone system of the type comprising a series of filament power consuming line selecting links and means including said links for setting up connections between the lines of the system and wherein said links are seized in accordance with the traffic requirements of the system, the combination of, a first group of continuously heated links within said series of links, means responsive to simultaneous seizure of a predetermined number of links in said first group for supplying filament power to a second group of links within said series, means responsive to seizure of any link in said second group for spplying filament power to the remaining links in said series, means responsive to seizure of any link in said second group for maintaining filament power supplied to the seized link in said second group, and means responsive to seizure of any one of said remaining links for maintaining filament power supplied to said seized remaining link.

11. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said links, means responsive to simultaneous seizure of a predetermined number of said continuously heated links for supplying filament power to a second group in said series of links, means responsive to seizure of any link in said second group for maintaining filament power supplied to said seized link, and means responsive to seizure of any link in said second group for supplying filament power to the remaining links in said series.

12. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, means responsive to simultaneous seizure of a predetermined number of said continuously heated links for supplying filament power to a second group of links in said series, and means responsive to seizure of any link in said second group for supplying filament power to the remaining links in said series and for maintaining filament power supplied to the seized link in said second group.

13. In an electronic telephone system of the type comprising a series of filament power consuming line selecting links and means including said links for setting up connections between the lines of the system and wherein said links are seized in accordance with the traffic requirements of the system, a first group of links within said series being continuously supplied with filament power, means for conserving the filament power consumed by said series of line selecting links comprising, a saturable core reactor having a plurality of control windings, a saturation winding and a plurality of locking windings, means for energizing successive ones of said control windings in accordance with seizure of successive ones of said first group of links, means controlled by said saturation winding for supplying filament power to the remaining ones of said series of links in response to simultaneous seizure of a predetermined number of links in said first group thereby to condition said remaining links for subsequent seizure, and means for energizing any one of said locking windings in accordance with seizure of any one of said remaining links.

14. In an electronic telephone system of the type comprising a series of filament power consuming line selecting links and means including said links for setting up connections between the lines of the system and wherein said links are seized in accordance with the traffic requirements of the system, a first group of links within said series being continuously supplied with filament power, means for conserving the filament power consumed by said series of line selecting links comprising, a saturable core reactor having a plurality of control windings and a saturation winding, means for energizing successive ones of said control windings in accordance with seizure of successive ones of said first group of links, means controlled by said saturation winding for supplying filament power to the remaining ones of said series of links in response to simultaneous seizure of a predetermined number of links in said first group thereby to condition said remaining links for subsequent seizure.

15. In an electronic telephone system of the type comprising a series of filament power consuming line selecting links and means including said links for setting up connections between the lines of the system and wherein said links are seized in accordance with the traffic requirements of the system, a first group of links within said series being continuously supplied with filament power, means for conserving the filament power consumed by said series of links comprising, a saturable core reactor having a plurality of control windings, each of said control windings being controlled by a link in said first group, a saturation winding on said saturable core reactor, means controlled by said saturation winding for supplying filament power to the remaining ones of said series of line selecting links in response to simultaneous seizure of a predetermined number of links in said first group thereby to condition said remaining links for subsequent seizure, and interlocking means responsive to seizure of any one of said remaining links for maintaining filament power supplied thereto during seizure thereof.

16. In an electronic telephone system of the type comprising a series of filament power consuming line selecting links and means including said links for setting up connections between the lines of the system and wherein said links are seized in accordance with the traffic requirements of the system, a first group of links within said series being continuously supplied with filament power, means for conserving the filament power consumed by said series of links comprising, a saturable core reactor having a plurality of control windings, each of said control windings being controlled by a link in said first group, a saturation winding on said saturable core reactor, means controlled by said saturation winding for supplying filament power to the remaining ones of said series of line selecting links in response to simultaneous seizure of a predetermined number of links in said first group thereby to condition said remaining links for subsequent seizure.

17. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, saturable core reactor means for supplying filament power to the remaining ones of said series of links in response to simultaneous seizure of a predetermined number of links in said first group thereby to condition said remaining links for subsequent seizure, and means responsive to seizure of any one of said remaining links for maintaining filament power supplied to the seized remaining link.

18. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, saturable core reactor means for supplying filament power to the remaining ones of said series of links in response to simultaneous seizure of a predetermined number of links in said first group thereby to condition said remaining links for subsequent seizure.

19. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, first saturable core reactor means for supplying filament power to a second group of links within said series of links in response to simultaneous seizure of a predetermined number of links in said first group, and second saturable core reactor means for supplying filament power to the remaining links in said series in response to seizure of any one of the links in said second group.

20. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, first saturable core reactor means for supplying filament power to a second group of links within said series of links in response to simultaneous seizure of a predetermined number of links in said first group, said first saturable core reactor means including means responsive to seizure of any link in said second group for maintaining filament power supplied to said seized link, and second saturable core reactor means for supplying filament power to the remaining links in said series in response to seizure of any one of the links in said second group.

21. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, first saturable core reactor means for supplying filament power to a second group of links within said series of links in response to simultaneous seizure of a predetermined number of links in said first group, and second saturable core reactor means for supplying filament power to the remaining links in said series in response to seizure of any one of the links in said second group, and means responsive to seizure of any one of said remaining links for maintaining filament power supplied to said seized remaining link.

22. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, a first saturable core reactor having a control winding connected to each of said continuously heated links, a first saturation winding and a locking winding connected to each link in a second group in said series of links, means controlled by said first saturation winding for supplying filament power to said second group of links in response to simultaneous seizure of a predetermined number of said continuously heated links, means responsive to seizure of any link in said second group for maintaining filament power supplied thereto, a second saturable core reactor having a control winding connected to each link in said second group a second saturation winding and a locking winding connected to each of the remaining links in said series, means controlled by said second saturation winding for supplying filament power to said remaining links, and means responsive to seizure of any one of said remaining links for maintaining filament power supplied to said seized remaining link.

23. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying filament power continuously to a first group of said line selecting links, a saturable core reactor having a control winding connected to each of said continuously heated links, a saturation winding and a locking winding connected to each link in a second group in said series of links, means controlled by said saturation winding for supplying filament power to said second group of links in response to simultaneous seizure of a predetermined number of said continuously heated links, and means responsive to seizure of any link in said second group for maintaining filament power supplied thereto.

24. In an electronic telephone system the combination of, a first group of continuously heated finder-connector links, a second group of links adapted to be seized in accordance with busy hour traffic of the system, and a third group of links adapted to be seized in accordance with fluctuations in busy hour traffic of the system, means responsive to simultaneous seizure of a predetermind number of links in said first group for supplying filament power to said second group of links, means responsive to seizure of any one of any link in said second group for supplying filament power to said third group of links, and locking means for maintaining filament power supplied to any seized link in said second and third groups.

25. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for continuously supplying filament power to a first group of said series of line selecting links, relay control means associated with individual ones of said first group of links for supplying filament power to a second group in said series of line selecting links in response to simultaneous seizure of a predetermined number of said first group of line selecting links, and relay control means associated with individual ones of said second group of line selecting links for supplying filament power to the remaining links in said series in response to seizure of any one link in said second group of links.

26. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for continuously supplying filament power to a first group of said series of line selecting links, and relay control means associated with individual ones of said first group of links for supplying filament power to a second group in said series of line selecting links in response to simultaneous seizure of a predetermined number of said first group of line selecting links.

27. In an electronic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for continuously supplying filament power to a first group of said series of line selecting links, and means responsive to seizure of at least one of the links in said first group over one of said lines for conditioning at least one of the remaining links in said series for operation by supplying rated filament power thereto.

28. In an automatic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying rated filament power to a first group of links in said series in accordance with the average traffic requirements of the system, and means for progressively increasing the filament power supplied to a second group of links in said series in proportion to the number of links in said first group which are simultaneously in use, whereby the links in said second group are conditioned for operation in response to the simultaneous seizure of a predetermined number of links in said first group.

29. In an automatic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising means for supplying rated filament power to a first group of links in said series in accordance with the average traffic requirements of the system, and means for reducing the filament preheating time of a second group of links in said series in proportion to the number of links in said first group which are simultaneously in use.

30. In an automatic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying rated filament power to a first group of links in said series in accordance with the average traffic requirements of the system, and means for reducing the filament preheating time of a second group of links in said series in proportion to the number of links in said first group which are simultaneously in use, said last named means being operative to supply rated filament power to the links in said second group when a predetermined number of links in said first group are simultaneously seized.

31. In an automatic telephone system of the type comprising a series of filament power consuming line selecting links and means including said links for setting up connections between the lines of the system and wherein said links are seized in accordance with the traffic requirements of the system, means for conserving the filament power consumed by said series of line selecting links comprising, means for supplying rated filament power to a first group of links in said series in accordance with the average traffic requirements of the system, means including a saturable core reactor jointly controlled by the links in said first group for supplying filament power to a second group of links in said series, said last named means being operative to supply rated filament power to the links in said second group when a predetermined number of links in said first group are simultaneously seized, and means responsive to seizure of any one link in said second group for maintaining rated filament power supplied to said one link while said one link remains seized.

32. In an automatic telephone system of the type comprising a series of line selecting links and means including said links for setting up connections between the lines of the system and wherein said links are seized in accordance with the traffic requirements of the system, means for conserving the filament power consumed by said series of line selecting links comprising, means for supplying rated filament power to a first group of links in said series in accordance with the average traffic requirements of the system, means including a saturable cone reactor for supplying filament power to a second group of links in said series, means controlled by the links in said first group for changing the saturation level of said reactor in proportion to the number of links in said first group which are simultaneously in use, the simultaneous seizure of a predetermined number of links less than the total number of links in said first group producing sufficient change in the saturation level of said reactor to supply rated filament power to at least one link in said second group, and means responsive to seizure of said one link in said second group for changing the saturation level of said reactor by an amount equal to the total change produced by said predetermined number of links in said first group, whereby rated filament power is supplied to said one link while said one link remains seized irrespective of the idle or busy condition of the links in said first group.

References Cited in the file of this patent

UNITED STATES PATENTS

| Number | Name | Date |
|---|---|---|
| 2,036,233 | Pakala | Apr. 7, 1936 |
| 2,272,755 | Summers | Feb. 10, 1942 |
| 2,350,177 | MacKen | May 30, 1944 |
| 2,385,061 | Clark | Sept. 18, 1945 |
| 2,414,936 | Edwards et al. | June 28, 1947 |
| 2,421,919 | Avery | June 10, 1947 |